(12) United States Patent
Seigeot

(10) Patent No.: US 6,314,794 B1
(45) Date of Patent: Nov. 13, 2001

(54) METHOD AND APPARATUS FOR DETECTING LEAKS IN HEAT EXCHANGERS FOR MOTOR VEHICLES

(75) Inventor: Bertrand Seigeot, Dingy Saint Clair (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/447,789

(22) Filed: Nov. 23, 1999

(30) Foreign Application Priority Data

Nov. 26, 1998 (FR) .................................................. 98 14879

(51) Int. Cl.$^7$ .............................. G01M 3/04; G01M 3/20
(52) U.S. Cl. .................................. 73/40.7; 73/40; 73/49.7
(58) Field of Search .............................. 73/40.7, 40, 49.7

(56) References Cited

U.S. PATENT DOCUMENTS

| | | | | |
|---|---|---|---|---|
| 4,584,877 | | 4/1986 | Brayman ................................ 73/40.7 |
| 4,608,866 | * | 9/1986 | Bergquist .............................. 73/40.7 |
| 4,683,749 | * | 8/1987 | Thurlow et al. ...................... 73/40.7 |
| 4,688,627 | * | 8/1987 | Jean-Luc et al. .................... 165/11.1 |
| 4,862,731 | * | 9/1989 | Gates ..................................... 73/40.7 |
| 5,131,263 | * | 7/1992 | Handke ................................. 73/40.7 |
| 5,161,408 | * | 11/1992 | McRae et al. ....................... 73/40.7 |
| 5,168,747 | * | 12/1992 | Weaver et al. ....................... 73/40.7 |
| 5,172,583 | * | 12/1992 | Tallon ................................... 73/40.7 |
| 5,375,456 | * | 12/1994 | Burns .................................... 73/40.7 |
| 5,553,483 | * | 9/1996 | Armentrout et al. ..................... 73/40 |
| 5,625,141 | * | 4/1997 | Mahoney et al. ..................... 73/40.7 |
| 5,767,391 | * | 6/1998 | Wong .................................... 73/40.7 |
| 6,050,133 | * | 4/2000 | Achter et al. ........................ 73/40.7 |

FOREIGN PATENT DOCUMENTS 2366553    4/1978   (FR) .

* cited by examiner

Primary Examiner—Daniel S. Larkin
Assistant Examiner—David J. Wiggins
(74) Attorney, Agent, or Firm—Sughrue, Mion, Zinn, Macpeak & Seas, PLLC

(57) ABSTRACT

According to the invention, the presence of leaks is tested by placing the heat exchanger under test in a leakproof test chamber, by connecting the heat exchanger to a pressurization device that establishes an appropriate air pressure inside the internal cavity of the heat exchanger, by establishing a vacuum around the heat exchanger in the leakproof test chamber by means of a pump system, and by detecting the presence of helium around the heat exchanger in the leakproof test chamber by means of a helium leak detector. Testing is performed by using the helium which is naturally present in the air. This improves the availability of the machine and the reliability of the leak test, while also eliminating constraints and costs associated with using a tracer gas.

16 Claims, 1 Drawing Sheet

METHOD AND APPARATUS FOR DETECTING LEAKS IN HEAT EXCHANGERS FOR MOTOR VEHICLES

The present invention relates to checking motor vehicle heat exchangers for leaks, for the purpose of enabling heat exchangers that have leaks greater than a predetermined threshold to be discarded.

The invention can be applied to any motor vehicle heat exchanger, including radiators for cooling the engine, radiators for heating the vehicle cabin, air-air coolers for turbocharged engines, oil coolers, gasoline coolers, and in general any heat exchanger as used in a motor vehicle.

BACKGROUND OF THE INVENTION

At present, motor vehicle heat exchangers are leak-tested using various possible methods, which are selected as a function of the type of leak that is being looked for.

A first method consists in immersing the heat exchanger in a liquid such as water, in putting the air in its internal cavity under pressure, and then looking for the appearance of bubbles leaving the heat exchanger and passing through the liquid. The quality of the results achieved depends significantly on the attention of the operator. Parts that have been tested need subsequently to be dried, thereby lengthening the inspection cycle. The operations performed are not traceable.

In a second method, a determined excess pressure is established inside the internal cavity; the heat exchanger is closed and the rate at which its internal pressure varies over time is measured. If it has a leak, then the pressure drops, and by measuring the pressure drop it is possible to deduce the magnitude of the leak. That method is of limited sensitivity. A test time of about 30 seconds is required for testing a part whose inside volume is one liter and to obtain sensitivity of a few cubic centimeters per minute. The result also depends on variations in temperature and in the volume of the heat exchanger.

In a third method, a helium test is used. For this purpose, the heat exchanger for testing is placed in a leakproof enclosure connected to a helium leak detector, and the heat exchanger is connected to pressurization apparatus of the kind shown in FIG. 1. Air pressure of the order of $2\times10^3$ hPa to $10\times10^3$ hPa, depending on the type of heat exchanger, is then established inside the internal cavity of the heat exchanger, and major leaks are looked for by measuring variation in the internal pressure of the heat exchanger. If there is no major leak, the pressure inside the heat exchanger is returned to atmospheric pressure, and then the inside air is evacuated to a low pressure, e.g. about 10 hPa, after which helium is introduced into the inside cavity of the heat exchanger up to a pressure of about $10^3$ hPa. Major leaks are then looked for by using a helium leak detector to detect the temporary presence of helium around the motor vehicle heat exchanger in the leakproof test chamber. Detection must be performed for helium concentrations that are much greater than the natural concentration of helium in the air. Thereafter, helium pressure of about $2\times10^3$ hPa to $10\times10^3$ hPa is established inside the heat exchanger and small leaks are looked for by detecting the presence of helium, if any, around the motor vehicle heat exchanger in the test chamber, again at a level that is significantly greater than the natural concentration of helium in the air. Thereafter the pressure inside the internal cavity of the heat exchanger is reduced to below atmospheric pressure, the heat exchanger is disconnected, and it is withdrawn from the test chamber.

Amongst the above-mentioned methods, the helium test is the most reliable, the most accurate, and the most sensitive. Nevertheless, it suffers from various drawbacks. Firstly, it is necessary to supply the helium tracer gas, at concentrations generally of the order of 10% to 100%, and this gas is consumed. That considerably increases the cost of the test. Thereafter, after massive exposure to helium, it is necessary to leave the machine unoccupied for as long as it takes to enable it to be depolluted. Also, the test is not entirely reliable since it often leads to acceptable parts being wrongly rejected. What happens is that when a defective heat exchanger having leaks is tested, helium escapes into the test chamber. After the defective heat exchanger has been withdrawn, residual helium can remain in the test chamber, thereby disturbing subsequent leak measurements on another heat exchanger, and giving the impression that said other heat exchanger also leaks.

OBJECTS AND SUMMARY OF THE INVENTION

The problem posed by the present invention is to design a novel method and novel apparatus for leak-testing motor vehicle heat exchangers, with sensitivity that is as good as that of a conventional helium test, while avoiding the drawbacks of the cost of consuming helium, while avoiding the time the machine is out of action so as to be depolluted after being massively exposed to helium, and while avoiding erroneous rejects that can result from residual helium being detected.

To achieve these objects, and others, the invention provides a method of leak-testing motor vehicle heat exchangers, such a heat exchanger comprising a peripheral wall surrounding an internal cavity, the method comprising a step during which an appropriate pressure of air is established inside the internal cavity of the heat exchanger, an appropriate vacuum is established around the peripheral wall of the heat exchanger, and the concentration of helium around the peripheral wall of the heat exchanger is detected by means of a helium leak detector. The helium leak detector thus measures leakage from the heat exchanger by means of the natural concentration of helium present in the compressed air.

In a practical implementation, the heat exchanger is placed in a leakproof test chamber connected to the helium leak detector and connected to a pump unit for establishing said appropriate vacuum, and the internal cavity of the heat exchanger is connected to an air pressurization device for establishing said appropriate air pressure.

Advantageously, to further improve the reliability with which leaks are detected, the leakproof test chamber prevents leakproofing of a quality that is significantly better than the quality of the leakproofing to be tested on a heat exchanger.

Also, the appropriate air pressure is about $6\times10^3$ hPa, and the pressure of air in the appropriate vacuum is less than $10^{-2}$ Pa, approximately. These values are given by way of indication, and depend on the required sensitivity, on the rate of testing, and on the volume of the test chamber.

Advantageously, apparatus of the invention for detecting motor vehicle heat exchanger leaks via the peripheral wall surrounding an internal cavity, comprises:

a leakproof test chamber connected to a pump unit and shaped so as to be capable of receiving and containing a heat exchanger under test;

a pressurization device and leakproof connection means to the internal cavity of the heat exchanger;

a helium leak detector connected to the leakproof test chamber;

the pressurization device being fed with air and being adapted to produce an appropriate air pressure inside the internal cavity of the heat exchanger; and the pump unit being adapted to establish a pressure of air inside the leakproof test chamber that is less than a pressure of about $10^{-2}$ Pa.

In practice, the pressurization device can comprise:

a source of compressed air producing, at its outlet, compressed air at an appropriate pressure;

a compressed air feed pipe connected to the outlet of the source of compressed air and provided with an inlet valve and with an outlet endpiece connectable to the heat exchanger under test; and an air exhaust pipe fitted with an air exhaust valve and adapted to put the internal cavity of the heat exchanger selectively into communication with the outside atmosphere.

It is thus possible to use a pressurization device whose structure is particularly simple and of low cost.

To establish a vacuum around the heat exchanger under test, the leakproof test chamber can be connected to the pump unit by a pump pipe fitted with a stop valve and with a branch connection to the helium leak detector, and the leakproof test chamber can be connected to the outside atmosphere via an air inlet pipe fitted with an air inlet valve.

Preferably, the leakproof test chamber is adapted to present leakproofing of a quality that is significantly greater than the quality of the leakproofing to be tested of the heat exchanger.

BRIEF DESCRIPTION OF THE DRAWING

Other objects, characteristics, and advantages of the present invention appear from the following description of particular embodiments, given with reference to the accompanying figures, in which.

MORE DETAILED DESCRIPTION

Figure 1:
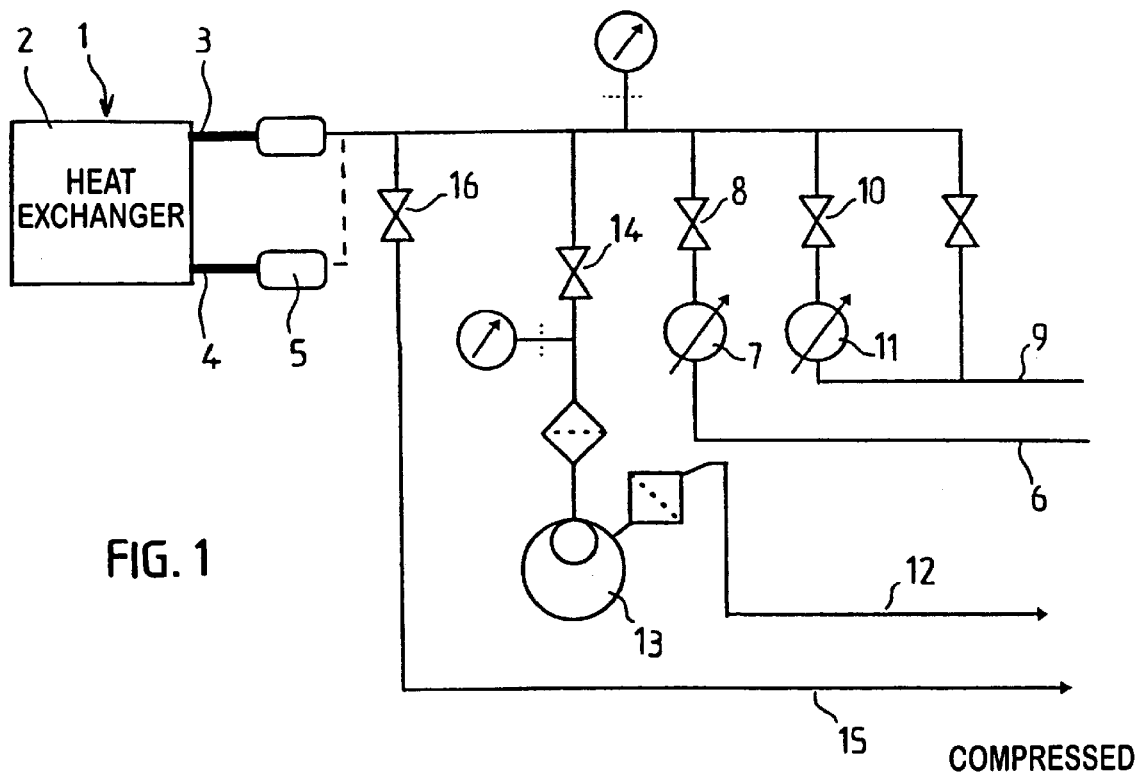
FIG. 1 is a pressurization diagram for a conventional helium leak test.

FIG. 1 is intended to show the relative complexity of a pressurization device as required for implementing a conventional helium test.

In such a test method, the heat exchanger 1 that has a leakproof internal cavity 2 conventionally includes an inlet pipe 3 and an outlet pipe 4. The outlet pipe 4 is closed with a stopper 5. Alternatively, the outlet pipe 4 can be connected to the inlet pipe 3 so as to increase gas flow and thus reduce test time. The inlet pipe 3 is connected to a set of pipes comprising:

an inlet pipe 6 for air under pressure, which pipe is provided with a pressure regulator 7 and a pressurized air inlet valve 8;

an inlet pipe 9 for helium under pressure which pipe is provided with at least one pressure regulator 11 and at least one pressurized helium inlet valve 10; and an air exhaust pipe 12 provided with a primary pump 13 and with an air exhaust valve 14 to establish a vacuum of about 10 hPa, and an air or helium exhaust pipe 15 fitted with an exhaust valve 16.

All of the elements of the above apparatus are required in order to be able to perform the steps of a conventional helium test as described above. It is possible to simplify the apparatus, but to the detriment of its performance in certain respects.

Figure 2:
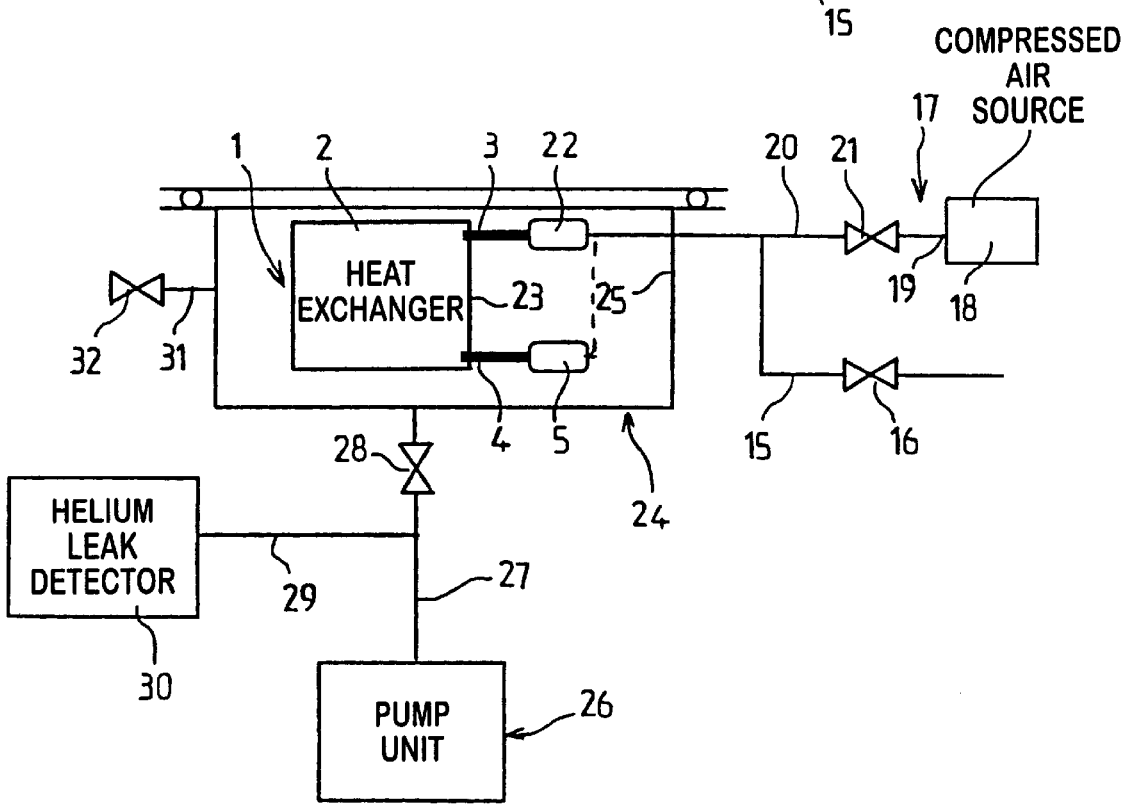
FIG. 2 is a theoretical diagram for leak detection apparatus constituting an embodiment of the present invention.

In the invention, leaks from a heat exchanger are tested by means of apparatus whose theoretical diagram is shown in FIG. 2. This figure shows the heat exchanger 1 having an internal cavity 2 which is closed by a peripheral wall 23 having an inlet pipe 3 and an outlet pipe 4. The outlet pipe 4 is closed by a stopper 5. The inlet pipe 3 is connected to a pressurization device 17. The pressurization device 17 shown in the figure comprises a source of compressed air 18 which produces compressed air at its outlet 19 at a pressure which is appropriate for the test. The air pressure that is generally used lies in the range $2 \times 10^3$ hPa to $10 \times 10^3$ hPa, using test conditions of the kind conventionally used by motor manufacturers. A compressed air feed pipe 20 is connected to the outlet of the compressed air source 18 and is provided with an inlet valve 21 and an outlet endpiece 22 suitable for connection to the heat exchanger 1 under test. In the figure, the outlet endpiece 22 is shown connected to the inlet pipe 3 of the heat exchanger 1.

An air exhaust pipe 15 fitted with an air exhaust valve 16 is adapted to put the internal cavity 2 of the heat exchanger 1 into communication with the outside atmosphere on a selective basis. For example, as shown in the figure, the air exhaust pipe 15 is connected to an intermediate segment of the compressed air feed pipe 20, between the inlet valve 21 and the outlet endpiece 22.

Thus, the pressurization device 17 is fed with air and is adapted to produce an appropriate air pressure in the internal cavity 2 of the heat exchanger 1.

A leakproof test chamber 24 is provided having a peripheral wall 25 provided with a leakproof door (not shown in the figure) and shaped to receive and contain the heat exchanger 1 under test. The compressed air feed pipe 20 passes through the peripheral wall 25 of the leakproof test chamber 24 in leakproof manner, thereby constituting means for establishing a leakproof connection to the internal cavity 2 of the heat exchanger 1.

The leakproof test chamber 24 is connected to a pump unit 26 via a pump pipe 27 fitted with a stop valve 28 and a branch connection 29 leading to a helium leak detector 30. The leakproof test chamber 24 is also connected to the outside atmosphere via an air inlet pipe 31 fitted with an air inlet valve 32. The leakproof test chamber 24 is adapted to present leakproofing properties that are significantly better than the quality of the leakproofing to be tested in the heat exchanger 1.

To leak-test the heat exchanger 1, it is placed in the leakproof test chamber 24, its outlet pipe 4 is closed by the stopper 5, and its inlet pipe 3 is connected to the outlet endpiece 22 from the pressurization device 17. The air exhaust valve 16 is closed. Similarly the air inlet valve 32 is closed. By opening the stop valve 28 and actuating the pump unit 26, a suitable vacuum is established inside the leakproof test chamber 24 around the heat exchanger 1. By opening the inlet valve 21, an appropriate air pressure is established inside the internal cavity 2 of the heat exchanger 1. By means of the helium leak detector 30, the concentration of helium around the peripheral wall 23 of the heat exchanger 1 is then detected.

Most motor vehicle heat exchangers require leakproofing to lie in the range 0.5 $cm^3$ to 5 $cm^3$ of air per minute when they are subjected to a given test pressure, in general lying in the range $2 \times 10^3$ hPa to $10 \times 10^3$ hPa. Heating radiators have the most stringent sensitivity requirements. Cooling radiators are less stringent.

This air leak for detection corresponds to a helium leak that is 200,000 times smaller, given that the natural concentration of helium in the air is about $5\times10^{-6}$.

The limit leak level to be looked for therefore lies in the range $4\times10^{-9}$ Pa·m³/s to $4\times10^{-8}$ Pa·m³/s of helium. A helium leak detector 30 is therefore selected which is capable of detecting leakage at that rate. At present, numerous suitable helium leak detectors are available on the market, based on the mass spectrometer.

To avoid disturbing measurement with the presence of residual helium coming from the air initially present inside the leakproof test chamber 24, it is necessary to establish inside the leakproof test chamber 24 a vacuum that is sufficiently hard. In practice, the pump unit 26 is selected to be capable of establishing a partial pressure of air inside the leakproof test chamber 24 that is less than $10^{-2}$ Pa. Such a pump unit 26 can be constituted, for example, by connecting in series two Roots pumps and a two-stage vane pump.

It will be understood that the pressurization scheme for use in the present invention is considerably simpler than the pressurization scheme required in FIG. 1 in a conventional helium test method.

The invention also provides better machine availability since no time is lost for depollution purposes.

The reliability of the test is improved since testing a faulty heat exchanger does not have any effect on subsequent testing of other heat exchangers.

The invention makes it possible to avoid consuming tracer helium gas, and also to avoid the time which is lost in handling gas cylinders.

In addition, the test method of the invention takes place in a single step, and it does not require any initial test for major leaks. As a result, testing throughput is limited solely by the performance of the pump unit 26.

For high testing throughputs, it can be advantageous to use a dual chamber system for test purposes, enabling parts to be put into one chamber and to be removed therefrom while testing is taking place in the other chamber.

A most significant advantage of the method of the invention is that whatever the size of the leak, there is no phenomenon of the system becoming polluted with tracer gas. The only precaution that needs to be taken to ensure that testing is reliable is to verify that the compressed air used for the test is not itself subject to an abnormal concentration of helium.

The method of the invention makes it possible to omit making any tests specifically for major leaks. The part under test can thus be pressurized directly to the final test air pressure as soon as the test chamber has begun to be evacuated.

If the test is looking for a leak of $10^{-3}$ Pa·m³/s, for example, then the quality with which the leakproof test chamber 24 is itself leakproof must be not worse than $10^{-4}$ Pa·m³/s.

The present invention is not limited to the embodiments that are described explicitly, but it includes variants and generalizations within the competence of the person skilled in the art.

What is claimed is:

1. A method of leak-testing motor vehicle heat exchangers, such a heat exchanger comprising a peripheral wall surrounding an internal cavity, the method comprising a step during which an appropriate pressure of air known to include helium is established inside the internal cavity of the heat exchanger, an appropriate vacuum is established around the peripheral wall of the heat exchanger so that the air does not leak into the heat exchanger, and the concentration of helium around the peripheral wall of the heat exchanger is detected by means of a helium leak detector.

2. A method according to claim 1, wherein the heat exchanger is placed in a leakproof test chamber connected to the helium leak detector and connected to a pump unit for establishing said appropriate vacuum, and the internal cavity of the heat exchanger is connected to an air pressurization device for establishing said appropriate air pressure.

3. A method according to claim 2, wherein the leakproof test chamber presents leakproofing of a quality that is significantly better than the quality of the leakproofing to be tested on a heat exchanger.

4. A method according to claim 1, wherein the appropriate air pressure is about $6\times10^3$ hPa, and the pressure of air in the appropriate vacuum is less than $10^{-2}$ Pa.

5. Apparatus for detecting leaks in motor vehicle heat exchangers having a peripheral wall surrounding an internal cavity, the apparatus being suitable for implementing a method according to claim 1, and comprising:

a leakproof test chamber connected to a pump unit and shaped so as to be capable of receiving and containing a heat exchanger under test;

a pressurization device and leakproof connection means to the internal cavity of the heat exchanger; and a helium leak detector connected to the leakproof test chamber;

wherein:

the pressurization device is fed with air known to include helium and is adapted to produce an appropriate air pressure inside the internal cavity of the heat exchanger; and the pump unit is adapted to establish a pressure of air inside the leakproof test chamber that is lower than $10^{-2}$ Pa.

6. Apparatus according to claim 5, wherein the pressurization device comprises:

a source of compressed air producing, at its outlet, compressed air at an appropriate pressure;

a compressed air feed pipe connected to the outlet of the source of compressed air and provided with an inlet valve and with an outlet endpiece connectable to the heat exchanger under test; and an air exhaust pipe fitted with an air exhaust valve and adapted to put the internal cavity of the heat exchanger selectively into communication with the outside atmosphere.

7. Apparatus according to claim 5, wherein the leakproof test chamber is connected to the pump unit by a pump pipe fitted with a stop valve and with a branch connection to the helium leak detector, and the leakproof test chamber is connected to the outside atmosphere via an air inlet pipe fitted with an air inlet valve.

8. Apparatus according to claim 5, wherein the leakproof test chamber is adapted to present leakproofing of a quality that is significantly greater than the quality of the leakproofing to be tested of the heat exchanger.

9. A method of leak-testing a closed container having a cavity, comprising the steps of:

placing the closed container in a leak-proof chamber, creating a vacuum in the chamber around an outside of the closed container, pressurizing the cavity of the closed container with air, and detecting a presence of a component gas of any air leaked to the outside of the closed container from the cavity to determine the presence of a leak in the closed container.

10. The method according to claim 9, wherein the component gas of air detected is helium.

11. The method according to claim 9, wherein the closed container is a motor vehicle heat exchanger.

12. The method according to claim 9, wherein the vacuum created in the chamber is lower than $10^{-2}$ Pa.

13. An apparatus for detecting leaks in a closed container having a cavity, comprising:

a sealed leak-proof test chamber in which said closed container is placed during detection for leaks, a pump unit connected to the test chamber and that creates a vacuum around an outside of the closed container, a gas component detection unit connected to the test chamber and that detects the presence and quantity of a gas component in said test chamber, a compressed air source connected to the closed container while disposed in said test chamber and that pressurizes the cavity of the closed container with air known to include the gas component.

14. The apparatus according to claim 13, wherein said component gas of is helium.

15. The apparatus according to claim 13, wherein said closed container is a motor vehicle heat exchanger.

16. The apparatus according to claim 13, wherein said pump is adapted to create a vacuum in said chamber of less than $10^{-2}$ Pa.

* * * * *